(12) United States Patent
Bassmann et al.

(10) Patent No.: US 9,175,606 B2
(45) Date of Patent: Nov. 3, 2015

(54) METHOD FOR RINSING A FUEL SYSTEM OF A GAS TURBINE AND ASSOCIATED FUEL SYSTEM

(75) Inventors: Carsten Bassmann, Neuss (DE); Volker Ertle, Hattingen (DE); Michael Nienhaus, Borken (DE); Horst Uwe Rauh, Essen (DE); Damian Razowski, Mülheim an der Ruhr (DE); Uwe Scheuer, Mülheim (DE); Ulrich Wagner, Engelskirchen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 976 days.

(21) Appl. No.: 12/996,864

(22) PCT Filed: Apr. 30, 2009

(86) PCT No.: PCT/EP2009/055266
§ 371 (c)(1),
(2), (4) Date: Mar. 7, 2011

(87) PCT Pub. No.: WO2009/149990
PCT Pub. Date: Dec. 17, 2009

(65) Prior Publication Data
US 2011/0146807 A1 Jun. 23, 2011

(30) Foreign Application Priority Data
Jun. 9, 2008 (DE) .......... 10 2008 027 409

(51) Int. Cl.
*F02C 7/22* (2006.01)
*F02C 7/232* (2006.01)
(Continued)

(52) U.S. Cl.
CPC .............. *F02C 7/232* (2013.01); *F02C 7/222* (2013.01); *F23K 5/18* (2013.01); *F01D 25/002* (2013.01); *F05D 2260/607* (2013.01);
(Continued)

(58) Field of Classification Search
CPC ............ F02C 7/232; F02C 9/38; F02C 7/222; F23D 2209/30; F23D 2204/10; F23K 2301/203
USPC ................. 60/775, 39.53, 39.55, 39.094, 779
See application file for complete search history.

(56) References Cited

U.S. PATENT DOCUMENTS 4,041,695 A 8/1977 Harper et al.
4,984,424 A * 1/1991 Shekleton .................. 60/39.094
(Continued)

FOREIGN PATENT DOCUMENTS

CN 1227310 A 9/1999
CN 1242469 A 1/2000
(Continued)

*Primary Examiner* — Ted Kim

(57) ABSTRACT

A method for flushing a section of a fuel system of a burner of a gas turbine is provided. The method includes the steps of providing a feed line for feeding fuel from a fuel source to the burner, providing a first feed point close to the burner and a second feed point remote from the burner in the feed line in each case for feeding a medium into the feed line, feeding the medium via the first feed point, and discharging, via the burner, the fuel which is in the feed line between the first feed point and the burner, and also feeding the medium via the second feed point, and discharging, via the first feed point, the fuel which is in the feed line between the second feed point and the first feed point.

7 Claims, 1 Drawing Sheet

(51) Int. Cl.
*F23K 5/18* (2006.01)
*F01D 25/00* (2006.01)

(52) U.S. Cl.
CPC ...... *F23K 2301/203* (2013.01); *F23N 2027/04* (2013.01); *Y10T 137/0424* (2015.04)

(56) References Cited

U.S. PATENT DOCUMENTS

| | | | |
|---|---|---|---|
| 5,720,164 A * | 2/1998 | Corbett et al. | 60/39.094 |
| 5,784,875 A | 7/1998 | Statler | |
| 6,092,362 A * | 7/2000 | Nagafuchi et al. | 60/739 |
| 6,250,065 B1 * | 6/2001 | Mandai et al. | 60/39.094 |
| 6,256,975 B1 | 7/2001 | Döbbeling et al. | |
| 6,367,239 B1 * | 4/2002 | Brown et al. | 60/39.55 |
| 7,104,070 B2 * | 9/2006 | Iasillo et al. | 60/775 |
| 2001/0022080 A1* | 9/2001 | Tanaka et al. | 60/39.465 |
| 2002/0026784 A1 | 3/2002 | Nakamoto | |
| 2004/0172951 A1* | 9/2004 | Hannemann et al. | 60/776 |
| 2007/0101720 A1* | 5/2007 | Kunkle et al. | 60/646 |
| 2007/0289308 A1 | 12/2007 | Nest | |
| 2009/0272118 A1* | 11/2009 | Alexander et al. | 60/39.463 |
| 2010/0031658 A1* | 2/2010 | Falke et al. | 60/734 |

FOREIGN PATENT DOCUMENTS

| | | |
|---|---|---|
| CN | 1519466 A | 8/2004 |
| CN | 1526927 A | 9/2004 |
| EP | 0939220 A1 | 9/1999 |
| EP | 1452802 A1 | 9/2004 |
| JP | 11210494 A | 8/1999 |
| JP | 11324720 A | 11/1999 |
| JP | 2000064855 A | 2/2000 |
| JP | 2002129981 A | 5/2002 |
| JP | 2007155170 A | 6/2007 |
| SU | 1815404 A1 | 5/1993 |
| TW | 418302 B | 1/2001 |
| TW | 434366 B | 5/2001 |

* cited by examiner

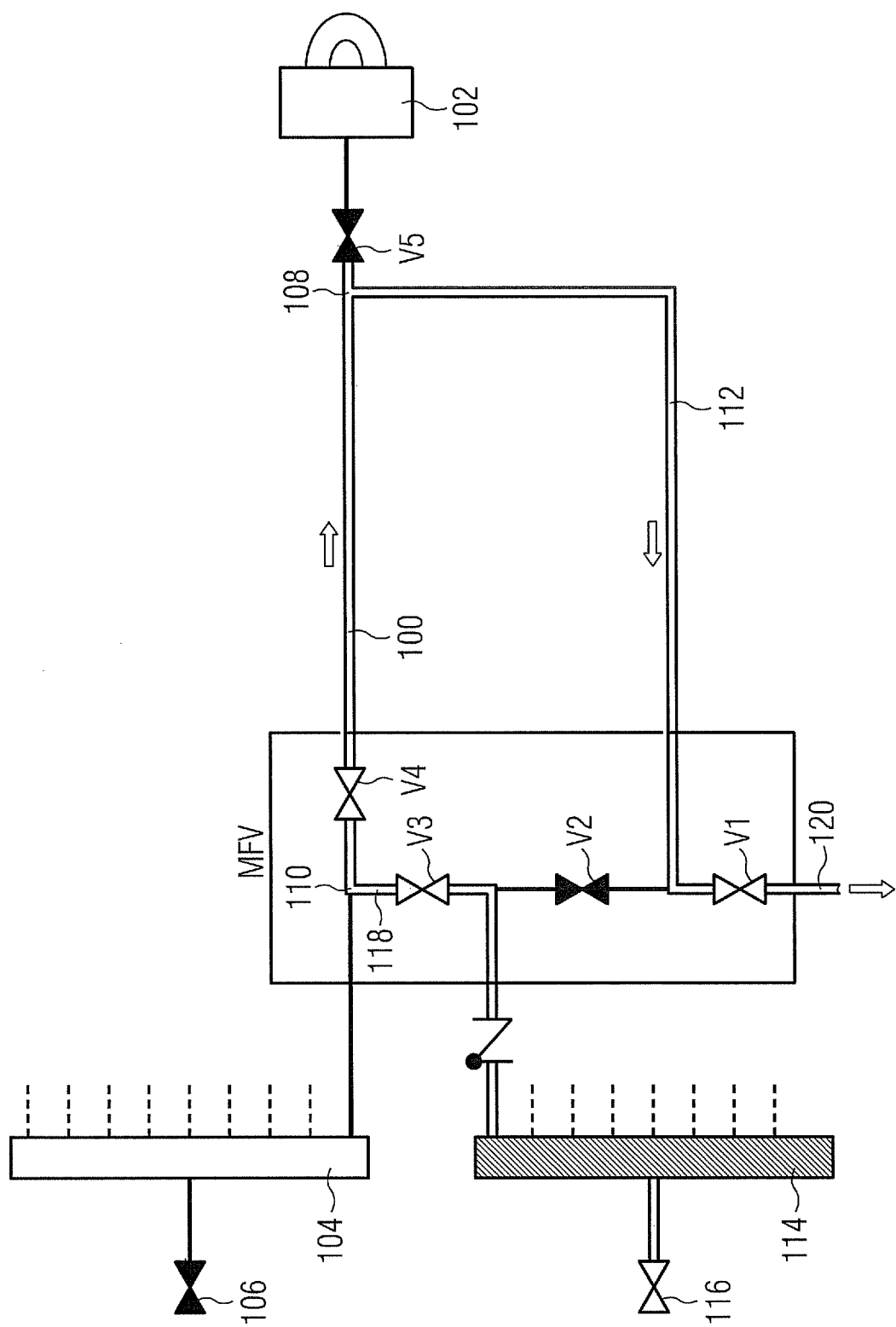

METHOD FOR RINSING A FUEL SYSTEM OF A GAS TURBINE AND ASSOCIATED FUEL SYSTEM

CROSS REFERENCE TO RELATED APPLICATIONS

This application is the US National Stage of International Application No. PCT/EP2009/055266, filed Apr. 30, 2009 and claims the benefit thereof. The International Application claims the benefits of German application No. 10 2008 027 409.7 DE filed Jun. 9, 2008. All of the applications are incorporated by reference herein in their entirety.

FIELD OF INVENTION

The invention refers to a method for flushing a section of a fuel system of a burner of a gas turbine with the steps: providing a feed line for feeding fuel from a fuel source to the burner and discharging or flushing out the fuel which is in the feed line. In addition, the invention refers to a fuel system of a burner of a gas turbine with a feed line for feeding fuel from a fuel source to the burner, and a feed point for feeding medium into the feed line.

BACKGROUND OF INVENTION

In the case of gas turbines with fuel oil operation, the fuel oil or the liquid fuel after operation must be removed from the burners and from the supply pipelines which are connected to them in order to prevent coking of the fuel oil on their hot surfaces. The coking would block lines and burners and therefore make them unusable.

A method is known from EP 0 939 220 A1, in which the burners and supply lines of gas turbines are flushed in order to therefore remove the fuel oil from the lines or from the burner. The known emptying of the fuel oil lines takes place in two steps: first of all the burners are flushed. For this purpose, water is pushed via a water line of an NOx-water supply (which for fuel oil/water-emulsion operation is available anyway) via a T-piece which is close to the burner into the fuel oil line rearwards in the direction of the fuel oil supply (fuel oil-water injection package), from where it is transported via open valves of a multifunction valve into an emptying facility. In the case of the flushing method of this type and the associated fuel system, the retention of residues in the fuel oil line may occur in the case of specific operating conditions.

A flushing system for the oil fuel line of a gas turbine burner is also known from US 2002/0026784. It is provided there that air or water for flushing can be fed to the fuel line via separate lines. The flushing can in that case take place successively or else at the same time. An analogous system for gas fuel lines is also known from U.S. Pat. No. 5,784,875.

In addition, US 2007/0289308 A1 discloses a fuel feed line in which the fuel that is in it can be sucked back out of the fuel line with the aid of an inversely driven fuel distributor. This fuel is subsequently returned into a collecting tank. Furthermore, it is known from U.S. Pat. No. 4,041,695 to combine a number of valves in a common valve block.

SUMMARY OF INVENTION

It is an object of the invention to create a method for flushing a section of a fuel system of a burner of a gas turbine, and also an associated fuel system, in which the aforementioned disadvantages are overcome and at the same time a simple and inexpensive manner of flushing is possible.

The object is achieved according to the invention with a method for flushing a section of a fuel system of a burner of a gas turbine as claimed in the claims, and a fuel system of a burner of a gas turbine as claimed in the claims. Advantageous developments of the invention are described in the dependent claims.

According to the invention, a method for flushing a section of a fuel system of a burner of a gas turbine is created with the following steps: providing a feed line for feeding fuel from a fuel source to the burner, providing a feed point which is close to the burner and a feed point which is remote from the burner in the feed line in each case for feeding medium into the feed line, feeding medium via the feed point which is close to the burner, and discharging, via the burner, the fuel which is in the feed line between the feed point which is close to the burner and the burner, and also feeding medium via the feed point which is remote from the burner, and discharging, via the feed point which is close to the burner, the fuel which is in the feed line between the feed point which is remote from the burner and the feed point which is close to the burner. The method of this type enables a simple, inexpensive and at the same time a particularly easily cleaning flushing of the feed line, particularly because in the case of the two flushing steps the fuel is delivered in the direction of the burner. The feed line is therefore flushed through in the same directions as the fuel also flows into it. This, so tests have shown, has the advantage that for example joints and connecting points in the feed line, which for reasons of construction are to be compulsorily provided, are cleaned better.

In the case of a first advantageous development of the method according to the invention, the method step of feeding medium via the feed point which is remote from the burner is carried out after the method step of feeding medium via the feed point which is close to the burner. With this development, less fuel is discharged into the burner than if the method steps are carried out in the other sequence.

In the case of a second advantageous development of the method according to the invention, the fuel which is in the feed line between the feed point remote from the burner and the feed point which is close to the burner is discharged via the feed point which is close to the burner into a drainage line. The drainage line enables a purposeful removal and disposal of the discharged fuel.

In the case of a third advantageous development of the method according to the invention, water is used as the medium. In the case of gas turbines water is already available in the NOx-water supply there, by means of which the water can be dosed into the burner during operation of the gas turbine in order to reduce the emission of nitrogen oxides.

In addition, the object is achieved according to the invention with a fuel system of a burner of a gas turbine, which fuel system is provided with a feed line for feeding fuel from a fuel source to the burner, in which feed line a feed point close to the burner and a feed point remote from the burner are provided in each case for feeding medium into the feed line.

In the case of a first advantageous development of the fuel system according to the invention, a first feed line is led to the feed point which is close to the burner, a second feed line is led to the feed point which is remote from the burner, and a control element is provided in the feed lines in each case upstream of the two feed points for adjusting the throughflow to the respective feed points. The control elements shut off the fuel feed line against the feed of foreign medium during normal operation of the burner.

In the case of a second advantageous development of the fuel system according to the invention, a discharge line (drainage), with a control element arranged therein, branches off from the first feed line between the feed point which is close to the burner and the control element which is arranged upstream of it. The discharge line purposefully carries away the flushed-out fuel and for this purpose can be opened with the said control element during the second method step.

In the case of a third advantageous development of the fuel system according to the invention, a control element is provided in the feed line between the feed point which is remote from the burner and the feed point which is close to the burner. This control element additionally serves for closing off the feed line during the first method step so that no fuel can be pushed back into the fuel supply, wherein backflowing of fuel in the feed line, which according to the invention is especially avoided, would also take place.

In the case of a fourth advantageous development of the fuel system according to the invention, the said control elements are grouped together as a multifunction control element or multifunction valve, forming a constructional module. The multifunction control element of this type can be produced and also tested as a module. In addition, it is to be actuated within the fuel system with only one cable bundle, in all, therefore, especially inexpensively.

In the case of a fifth advantageous development of the fuel system according to the invention, a control element is provided in the feed line between the feed point which is close to the burner and the burner. This control element safely prevents leakage of fuel during the second method step.

BRIEF DESCRIPTION OF THE DRAWINGS

An exemplary embodiment of the solution according to the invention is subsequently explained in more detail with reference to the attached schematic drawings. In the drawing:

FIG. 1 shows a schematic layout of an exemplary embodiment of a fuel system of a gas turbine according to the invention.

DETAILED DESCRIPTION OF INVENTION

In FIG. 1, a fuel system according to the invention is shown, in which liquid fuel in the form of fuel oil from a (not shown) fuel source can be delivered through a valve 106, a fuel-oil flow-splitter 104, and a feed line 100 into one (of a plurality of) burner(s) 102. A feed point 108 which is close to the burner and a feed point 110 which is remote from the burner are formed in the feed line 100. A first feed line 112, through which water as flushing medium for the feed line 100 and the burner 102 can be made available through a valve V2, a water distributor 114 and a control valve 116 from an (not shown) NOx-water supply as a water source, leads to the feed point 108 which is close to the burner.

From the water-distributor 114, a second feed line 118, with a valve V3 arranged therein, leads to the second feed point 110. In addition, a valve V4 is arranged in the line section of the feed line 100 between the first and the second feed point 108 or 110. Finally, a drainage line 120, with a valve V1 arranged therein, leads from the first feed line 112, downstream of the valve V2 in the flow direction, to a further drainage which is not shown. The valves V1, V2, V3 and V4 are grouped together in a multifunction valve MFV, forming a constructional module.

A shut-off element in the form of a valve V5 is located in the line section of the feed line 100 between the feed point 108 and the burner 102.

For flushing the lines of the fuel system of this type of a gas turbine, i.e. the feed line 100, the emptying of the fuel oil lines takes place in two steps: first of all, the burners 102 are flushed with a medium, specifically water. For this purpose, water from the NOx-water supply is pushed via the water line or feed line 112 and the T-piece 108 which is close to the burner (feed point close to the burner) into the combustion chamber or into the burner 102 (valve V2 open; V1, V3 and V4 closed). As a result, the burner 102 and the line section between T-piece 108 and burner 102 (which line section is typically shorter than 1 m (meter)) is emptied of fuel oil.

In the second step, water is directed via the multifunction valve MFV, or via the feed point 110 which is remote from the burner, from the fuel oil-water injection package (control element 116 and water distributor 114) into the fuel oil line or feed line 100 (V2 closed; V1, V3 and V4 open). The water pushes the fuel oil forwards in the direction of the burner 102. It is not injected into the burner 102 there, however, (this would lead to undesirable post-combustion effects), but is pushed rearwards via the T-piece 108 into the water line or feed line 112, wherein the burner feed at this point in time is closed off by means of the valve V5 (as a suitable fitting).

Close to the fuel oil supply (on the fuel oil-water injection package), the fuel oil is then transported via the valve V1 through the drainage line 120 into an emptying facility or into the drainage system.

The invention allows a complete flushing of the fuel oil lines or feed lines 100 in the normal fuel oil flow direction.

Further advantages are a safer removal of the fuel oil from the fuel oil lines even in the case of low or absent combustion chamber pressure, and also shorter flushing times as a result of higher flushing flow.

The invention claimed is:

1. A method for flushing a section of a fuel system of a burner of a gas turbine, comprising:
    providing a feed line for feeding fuel from a fuel source to the burner;
    providing a first feed point which is close to the burner and a second feed point which is remote from the burner in the feed line in each case for feeding a medium into the feed line via a first feed line or via a second feed line, respectively;
    feeding the medium via the first feed point, and discharging via the burner, the fuel which is in the feed line between the first feed point and the burner; and
    feeding the medium via the second feed point and discharging via the first feed point the fuel which is in the feed line between the second feed point and the first feed point into the first feed line,
    wherein the fuel which is discharged into the first feed line is fed into a drainage line which branches off from the first feed line between the first feed point and a second control element, and
    wherein the second control element is provided in a flow connection with the first feed line upstream of the first feed point for adjusting the throughflow to the first feed point,
    wherein a third control element is provided in the second feed line upstream of the second feed point for adjusting the throughflow to the second feed point.

2. The method as claimed in claim 1, wherein the feeding of the medium via the second feed point is carried out after the feeding of the medium via the first feed point.

3. The method as claimed in claim 1, wherein the fuel which is in the feed line between the second feed point and the first feed point is discharged via the first feed point into the drainage line.

4. The method as claimed in claim 1, wherein water is used as the medium.

5. A fuel system of a burner of a gas turbine, comprising:
a feed line for feeding fuel from a fuel source to the burner;
a first feed point which is close to the burner;
a second feed point which is remote from the burner;
a first control element,
wherein the first feed point and the second feed point are provided in each case for feeding a medium into the feed line,
wherein the first control element is provided in the feed line between the first feed point and the burner,
wherein a first feed line is led to the first feed point,
wherein a second feed line is led to the second feed point,
wherein a second control element is provided in a flow connection with the first feed line upstream of the first feed point for adjusting the throughflow to the first feed point,
wherein a third control element is provided in the second feed line upstream of the second feed point for adjusting the throughflow to the second feed point, and
wherein a discharge line, with a fourth control element arranged therein, is branched off from the first feed line between the first feed point and the second control element.

6. The fuel system as claimed in claim 5, wherein a fifth control element is provided in the feed line between the second feed point and the first feed point.

7. The fuel system as claimed in claim 6, wherein the second, third, fourth, and fifth control elements are grouped together as a multifunction control element, forming a constructional module.

* * * * *